US008625784B2

(12) United States Patent
Sung et al.

(10) Patent No.: US 8,625,784 B2
(45) Date of Patent: Jan. 7, 2014

(54) BROADCAST ENCRYPTION METHOD AND BROADCAST DECRYPTION METHOD THEREOF

(75) Inventors: Maeng Hee Sung, Seoul (KR); Weon Il Jin, Suwon-si (KR); Heejean Kim, Yongin-si (KR); Baeeun Jung, Seongnam-si (KR); Tae-Chul Jung, Seongnam-si (KR); Jong Hwan Park, Seoul (KR); Dong Hoon Lee, Seoul (KR); Jong In Lim, Seoul (KR); Kyu Young Ohoi, Seoul (KR); Jung Yeon Hwang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1288 days.

(21) Appl. No.: 11/871,181

(22) Filed: Oct. 12, 2007

(65) Prior Publication Data
US 2008/0152132 A1    Jun. 26, 2008

(30) Foreign Application Priority Data

Dec. 22, 2006  (KR) .................. 10-2006-0133165
Apr. 12, 2007  (KR) .................. 10-2007-0036133

(51) Int. Cl.
*H04L 29/06*  (2006.01)

(52) U.S. Cl.
USPC ........................................ 380/44; 713/150

(58) Field of Classification Search
None
See application file for complete search history.

(56) References Cited

U.S. PATENT DOCUMENTS

| 2004/0111615 | A1 |  | 6/2004 | Nyang et al. |
| 2004/0240672 | A1 |  | 12/2004 | Girault et al. |
| 2005/0050333 | A1 | * | 3/2005 | Yeap et al. ..................... 713/182 |
| 2005/0157874 | A1 | * | 7/2005 | Bresson et al. ................. 380/30 |
| 2006/0136726 | A1 |  | 6/2006 | Ragnet et al. |
| 2006/0177067 | A1 |  | 8/2006 | Kim et al. |
| 2006/0190726 | A1 |  | 8/2006 | Brique et al. |
| 2007/0016781 | A1 |  | 1/2007 | Asokan et al. |
| 2009/0074179 | A1 | * | 3/2009 | Futa et al. ....................... 380/28 |
| 2010/0104094 | A1 | * | 4/2010 | Takashima ..................... 380/28 |

FOREIGN PATENT DOCUMENTS

| KR | 2004-50561 | 6/2004 |
| KR | 2004-50625 | 6/2004 |
| KR | 2005-87997 | 9/2005 |
| KR | 2006-23086 | 3/2006 |
| KR | 2006-88995 | 8/2006 |
| KR | 2006-123653 | 12/2006 |

OTHER PUBLICATIONS

Barth, Boneh, Waters; "Privacy in Encrypted Content Distribution Using Private Broadcast Encryption", Financial Cryptography and Data Security, Lecture Notes in Computer Science, vol. 4107, 2006, Springer Berlin / Heidelberg, p. 52-64.*

(Continued)

*Primary Examiner* — Jeffery Williams
(74) *Attorney, Agent, or Firm* — Stein IP, LLC

(57) ABSTRACT

A broadcast encryption method and a broadcast decryption method. The broadcast encryption method includes generating a message encryption key using a public key and a secret key generated by using a Strong Diffie-Hellman tuple; encrypting a message by the message encryption key; and generating a message header using a sum of a plurality of Strong Diffie-Hellman tuples corresponding to an authorized user group. Accordingly, a transmission amount and a storage amount can be reduced when a broadcast encryption message is transmitted.

13 Claims, 9 Drawing Sheets

(56) References Cited

OTHER PUBLICATIONS

Nuttapong Attrapadung, Jun Fukawa and Hideki Imai, "Forward-Secure and Searchable Broadcast Encryption with Short Ciphertexts and Private Keys", Advances in Cryptology—ASIACRYPT 2006, Lecture Notes in Computer Science, 2006, vol. 4284/2006, 161-177, DOI: 10.1007/11935230_11.*

Boneh, Boyen, Shacham, "Short Group Signatures", Advances in Cryptology—CRYPTO 2004, Lecture Notes in Computer Science, 2004, Springer Berlin / Heidelberg, Isbn: 978-3-540-22668-0, p. 227-242, vol. 3152, Doi: 10.1007/978-3-540-28628-8_3.*

Yong Wang; Ramamurthy, B.; Xukai Zou; , "The Performance of Elliptic Curve Based Group Diffie-Hellman Protocols for Secure Group Communication over Ad Hoc Networks," Communications, 2006. ICC '06. IEEE International Conference on , vol. 5, No., pp. 2243-2248, Jun. 2006 doi: 10.1109/ICC.2006.255104 "URL: http://ieeexplore.ieee.org/stamp/stamp.jsp?tp=&a".*

Michael Steiner, Gene Tsudik, and Michael Waidner. 1996. Diffie-Hellman key distribution extended to group communication. In Proceedings of the 3rd ACM conference on Computer and communications security (CCS '96). ACM, New York, NY, USA, 31-37. DOI=10.1145/238168.238182 http://doi.acm.org/10.1145/238168.238182.*

Jung Hee Cheon. 2006. Security analysis of the strong diffie-hellman problem. In Proceedings of the 24th annual international conference on the Theory and Applications of Cryptographic Techniques (EUROCRYPT'06), Serge Vaudenay (Ed.). Springer-Verlag, Berlin, Heidelberg, 1-11. DOI=10.1007/11761679_1 http://dx.doi.org/10.1007/11761679_1.*

"Collusion Resistant Broadcast Encryption with Short Ciphertexts and Private Keys", Boneh, Dan; Gentry, Craig; Waters, Brent; International Association for Cryptologic Research 2005, pp. 258-275.

* cited by examiner

BROADCAST ENCRYPTION METHOD AND BROADCAST DECRYPTION METHOD THEREOF

CROSS-REFERENCE TO RELATED APPLICATIONS

This application claims the benefit of Korean Patent Application No. 2006-133165, filed in the Korean Intellectual Property Office on Dec. 22, 2006, and Korean Patent Application No. 2007-36133, filed in the Korean Intellectual Property Office on Apr. 12, 2007, the disclosure of both of which are incorporated herein by reference.

BACKGROUND OF THE INVENTION

1. Field of the Invention

Aspects of the present invention relate to a broadcast encryption method and a broadcast decryption method, and more particularly, to a broadcast encryption method and a broadcast decryption method that can generate a public key and a secret key using a Strong Diffie-Hellman tuple.

2. Description of the Related Art

Recently, research on broadcast encryption is actively under way. Broadcast encryption indicates that only a user included in a user group S restores a message encryption key using a header, and decrypts an encrypted message using the restored message encryption key when a broadcasting center transmits a list of users in a user group S, a header, and an encrypted message to a plurality of users. The user included in the user group S is referred to as an authorized user. Only the authorized user can acquire a message. A user excluded from the user group S cannot acquire the message. Broadcast encryption can be used efficiently for a satellite television receiving service of a paid channel and for transmitting content protected by copyright, since only the authorized user can acquire an encryption key by only one-time broadcasting.

Broadcast encryption employs two types of encryption: symmetric key and public key. In the symmetric key setting, only a trusted broadcasting center generates and distributes a secret key of a user, and transmits a broadcast message to the user. The trusted broadcasting center is entirely responsible for the broadcast encryption. The entire broadcast encryption system is paralyzed when a malfunction of the trusted broadcasting center occurs, and a complex key update process is needed when a member joins or leaves the user group.

The public key setting can overcome some drawbacks of the symmetric key setting, since any group member can transmit the broadcast message by using a public key commonly used in a system and the need for complex key update processes is eliminated. Also, the broadcast encryption of the public key setting can be easily converted into the symmetric key setting. D. Boneh, C. Gentry, and B. Waters proposed a public key-based broadcast encryption method having efficiency in a transmission amount and a storage amount by using a pairing on an elliptic curve in a paper "Collusion resistant broadcast encryption with short ciphertexts and private keys" in CRYPTO vol. 3621, pp. 258-275 published in 2005. However, according to the method proposed by Boneh, Gentry, and Waters, since 2n+1 public keys are needed for n-number of users, and 2n−1 public keys are needed for decryption, a new broadcast encryption method and a new broadcast decryption method, which can reduce a number of necessary public keys and thereby reduce a transmission amount, are needed.

SUMMARY OF THE INVENTION

Aspects of the present invention provide a broadcast encryption method and a broadcast decryption method that can reduce a transmission amount and a storage amount by using a Strong Diffie-Hellman tuple, thereby performing broadcast encryption/decryption.

Aspects of the present invention also provide a broadcast encryption method and a broadcast decryption method that can generate a message header by using only a Strong Diffie-Hellman tuple corresponding to either an authorized user group or a leaver group, or can transmit the Strong Diffie-Hellman tuple included in a public key, thereby efficiently performing broadcast encryption/decryption.

Aspects of the present invention also provide a broadcast encryption method and a broadcast decryption method that can divide all users into a plurality of small groups, and enable each small group to share a Strong Diffie-Hellman tuple, thereby efficiently reducing a transmission amount of broadcast encryption.

According to an aspect of the present invention, a broadcast encryption method is provided. The method includes generating a message encryption key using a public key and a secret key generated using a Strong Diffie-Hellman tuple; encrypting a message using the message encryption key; generating a message header using a sum of a plurality of Strong Diffie-Hellman tuples corresponding to an authorized user group; and transmitting the message header, the encrypted message, and the Strong Diffie-Hellman tuple to at least one receiver.

According to another aspect of the present invention, a broadcast decryption method is provided. The method includes receiving, by a user included in an authorized user group, a Strong Diffie-Hellman tuple corresponding to the group from within a public key, a message header, and an encrypted message; calculating a value using the Strong Diffie-Hellman tuple and the message header in accordance with the following Equation:

$$\sum_{j \in S, j \neq i} a_{ij} G_i + b_{ij} G_j, \qquad \text{[Equation]}$$

where $a_{ij}=1/(j-i)$, $b_{ij}=-1/(j-i)$, S denotes the authorized user group, $Gi=(1/(x+i))G$, $Gj=(1/(x+j))G$, G denotes a generator of a group having an order p on an elliptic curve, i denotes an index corresponding to the user receiving an encrypted message, and j denotes an index of a member included in the authorized user group other than the user i;

performing a pairing operation by using the calculated value and restoring an encryption key; and decrypting the encrypted message by using the encryption key.

According to another aspect of the present invention, a broadcast encryption apparatus is provided. The apparatus includes an encryption key generator to generate a message encryption key using a secret encryption key known to only an authenticated broadcasting center; an encrypter to encrypt a message using the message encryption key; a header generator to generate a message header using the secret encryption key and a Strong Diffie-Hellman tuple corresponding to an authorized user; and a transmitter to transmit the encrypted message and the message header to at least one receiver.

According to another aspect of the present invention, a broadcast decryption apparatus is provided. The apparatus includes a receiver to receive a message header, an encrypted message, and a Strong Diffie-Hellman tuple corresponding to a group of authorized users; an encryption key restorer to perform a pairing operation using a decryption key for each user being unique for each authorized user, the message header, and the Strong Diffie-Hellman tuple, and to restore an encryption key; and a decrypter to decrypt the encrypted message using the encryption key.

The Strong Diffie-Hellman tuple described herein is described in detail in Dan Boneh, Xavier Boyen, and Hovav Shacham's "Short group signatures", in CRYPTO 2004, volume 3152 of LNCS, pages 41-55. Springer-Verlag, 2004, and the like.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
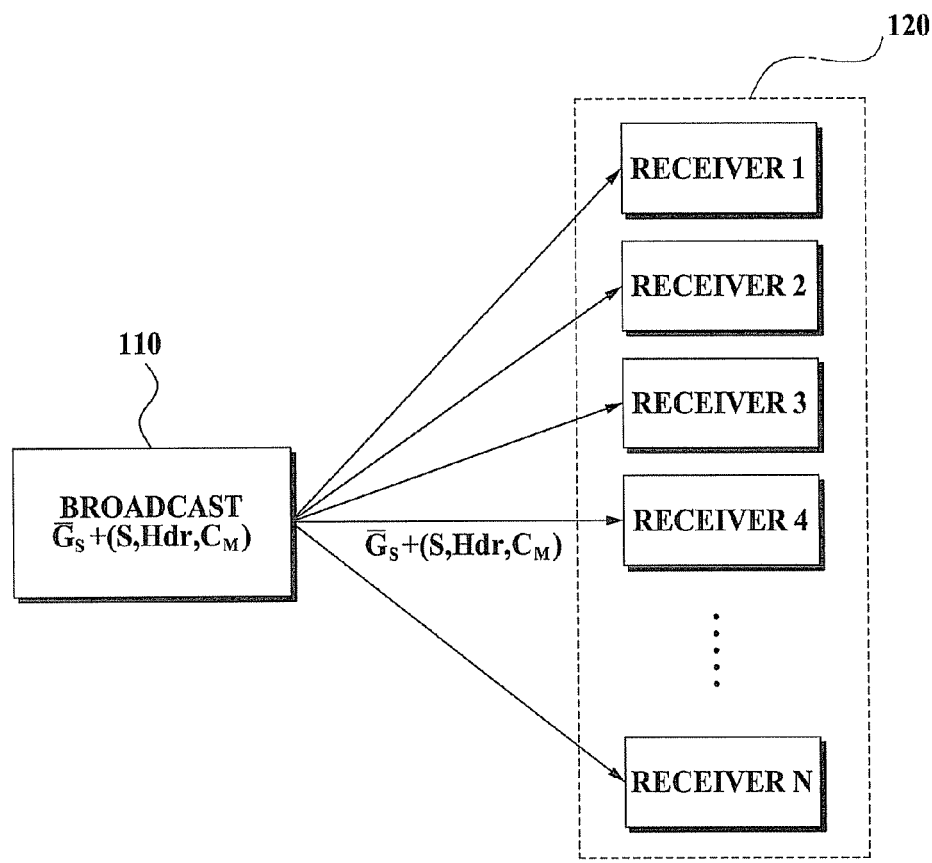
FIG. 1 is a diagram illustrating broadcast encryption message transmission according to an example embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Symbols used in the present invention are defined as follows.

G: a generator of a group having an order p on an elliptic curve

H: an arbitrary element of a group generated by G

W: an arbitrary element of a group generated by G

Zp: a group having an order p x: an arbitrary element selected from a group Zp, x being used as a random number for generating a public key and a secret key s: an arbitrary element selected from a group Zp, s being used to randomly generate a message encryption key K transmitted each time S: an authorized user group selected from n users i: a user intending to acquire a message encryption key K from a message header Hdr as an authorized user of S j: users corresponding to an authorized user of S except for the authorized user i e( ): a pairing function defined on an elliptic curve $Gi=(1/(x+i))G$ for $i=1,\ldots,n$ $\hat{G}_S$: a set of Gi's related to S A Strong Diffie-Hellman tuple according to aspects of the present invention may denote only $(1/(x+i))G$ from among $((1/(x+i))G, i)$.

FIG. 1 is a diagram illustrating broadcast encryption message transmission according to an embodiment of the present invention. A transmitter 110 transmits a Strong Diffie-Hellman tuple $\hat{G}_S$ corresponding to an authorized user group S from within a public key, the authorized user group S, a message header Hdr, and an encrypted message $C_M$ to a plurality of receivers 120. The receiver 120 may be any device capable of receiving broadcast encryption, such as a desktop computer, a laptop computer, a mobile phone, a personal digital assistant (PDA), or a personal entertainment device. The broadcast encryption processes according to aspects of the present invention may be adapted for use with any transmission standard, such as Ethernet, Wi-Fi, Bluetooth, or the like. Similarly, the processes may be employed using wired and/or wireless connections.

The Strong Diffie-Hellman tuple $\hat{G}_S$ corresponding to the authorized user group S may be a set of Gi's related to the authorized user group S from among Gi's. The encrypted message $C_M$ is encrypted using an encryption key K. The encrypted message may be generated using a public key. A secret key is generated using the Strong Diffie-Hellman tuple. The secret key may be a secret key corresponding to the transmitter 110 of FIG. 1. The header Hdr may be generated using a sum of a plurality of Strong Diffie-Hellman tuples corresponding to the authorized user group.

As illustrated in FIG. 1, a broadcast encryption process and a broadcast decryption process according to aspects of the present invention transmit only the plurality of Strong Diffie-Hellman tuples corresponding to the authorized user group from within the public key, without needing to transmit all public keys when the public key is transmitted with the authorized user group S, the message header Hdr, and the encrypted message $C_M$.

Users corresponding to the authorized user group S from among the plurality of receivers 120 may restore the encryption key K using a transmitted plurality of information. Users different from the authorized user group S cannot restore the encryption key K based on the transmitted plurality of information.

Figure 2:
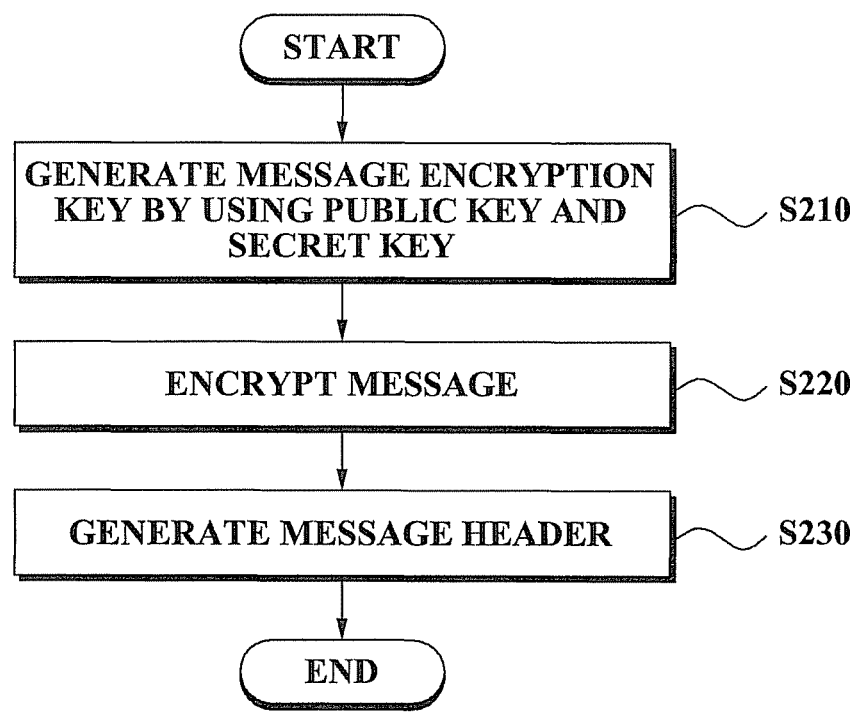
FIG. 2 is a flowchart illustrating a broadcast encryption method according to an example embodiment of the present invention.

FIG. 2 is a flowchart illustrating a broadcast encryption process according to an embodiment of the present invention. At operation S210, a message encryption key is generated using a public key and a secret key generated using a Strong Diffie-Hellman tuple.

The public key can be generated using Equation 1:

$$PK = \left(G, H, \frac{1}{x+1}G, \frac{1}{x+2}G, \ldots, \frac{1}{x+n}G\right) \quad \text{[Equation 1]}$$

$$x \in Z_p,$$

where PK denotes a public key, G denotes a generator of a group having an order p on an elliptic curve, H denotes arbitrary elements in a group generated by G, x denotes an arbitrary element selected from a group Zp, and n denotes a total number of users. In Equation 1, $(1/(x+1))G$, $(1/(x+2))G$, ..., and $(1/(x+n))G$ comprise the Strong Diffie-Hellman tuple.

The secret key may be generated using Equation 2:

$$D_i = W + \frac{1}{x+i}H + \frac{1}{(x+i)^2}G,\qquad \text{[Equation 2]}$$

where Di denotes a secret key of a user i from among a number of users, G denotes a generator of a group having an order p on an elliptic curve, W and H denote arbitrary elements in a group generated by G, x denotes an arbitrary element selected from a group Zp, i denotes a natural number in a range of 1≤i≤n, and n denotes a total number of users.

Public key generation and secret key generation according to the present invention may be performed in the following sequence. First, a group having the order p on the elliptic curve, the generator G, and random numbers W and H are established. The Strong Diffie-Hellman tuple of a user index i is calculated as (1/(x+i))G, with respect to a random number x. The public key and the secret key are generated in accordance with Equation 1 and Equation 2.

In operation S210, the message encryption key may be generated using Equation 3:

$$K = e(W, G)^s, s \in Zp \qquad \text{[Equation 3]}$$

$$e(W, G) = \frac{e(D_i, G)}{e(H, G_i)e(G_i, G_i)},$$

where K denotes a message encryption key, e( ) denotes a pairing function defined on an elliptic curve, Di denotes a secret key of a user i from among a number of users, G denotes a generator of a group having an order p on an elliptic curve, W and H denote arbitrary elements of a group generated by G, s denotes an arbitrary element selected from the group Zp, and Gi=(1/(x+i))G.

The transmitter 110 calculates e(W, G) using the public key PK and the secret key Di of the transmitter, and generates the encryption key in accordance with Equation 3 using the calculated e(W, G). Here, the user i described above indicates the transmitter 110.

In operation S220, a message is encrypted using the generated message encryption key. In operation S230, a message header is generated using a sum of a plurality of Strong Diffie-Hellman tuples corresponding to an authorized user group. The message header can be generated using Equation 4:

$$Hdr = \left(s\left(H + \sum_{j \in S} G_j\right), sG\right), \qquad \text{[Equation 4]}$$

where Hdr denotes a message header, G denotes a generator of a group having an order p on an elliptic curve, H denotes an arbitrary element of a group generated by G, s denotes an arbitrary element selected from a group Zp, Gj=(1/(x+j))G, and S denotes an authorized user group.

The transmitter 110 broadcasts the authorized user group S, the message header Hdr, and the encrypted message $C_M$ after performing broadcast message encryption described with reference to FIG. 2. The transmitter 110 may transmit the Strong Diffie-Hellman tuple $\hat{G}_S$ corresponding to the group from within the public key along with the message header Hdr and the encrypted message $C_M$.

According to other aspects of the present invention, the transmitter 110 does not transmit, with the broadcast message, the Strong Diffie-Hellman tuple $\hat{G}_S$ corresponding to the group from within the public key. The receiver can receive and store the Strong Diffie-Hellman tuple $\hat{G}_S$ corresponding to the group from within the public key prior to receiving the broadcast message.

The broadcast encryption process of FIG. 2 may be applied to each small group into which an entire user group is divided. The message header may be generated using a sum of the plurality of Strong Diffie-Hellman tuples corresponding to each small group. Specifically, if a total number of users is 25, each of five small groups including five users for each small group may generate the public key and the secret key using the Strong Diffie-Hellman tuple, generate the encryption key and the header, and broadcast the public key, the message header, and the encrypted message, similar to the broadcast encryption process shown in FIG. 2. In this instance, the message header may be generated using Equation 5:

$$Hdr = \left[s\left(H_1 + \sum_{j \in S_1} G_j\right), s\left(H_2 + \sum_{j \in S_2} G_j\right),\right. \qquad \text{[Equation 5]}$$
$$\left.s\left(H_3 + \sum_{j \in S_3} G_j\right), s\left(H_4 + \sum_{j \in S_4} G_j\right), s\left(H_5 + \sum_{j \in S_5} G_j\right), sG\right],$$

where Hdr denotes a message header, G denotes a generator of a group having an order p on an elliptic curve, H1 through H5 denote arbitrary elements in a group respectively generated by G, s denotes an arbitrary element selected from the group Zp, Gj=(1/(x+j))G, and S1 through S5 denote small groups. It is understood that Equation 5 may be modified to accommodate any predetermined number of groups having any number of users.

Figure 3:
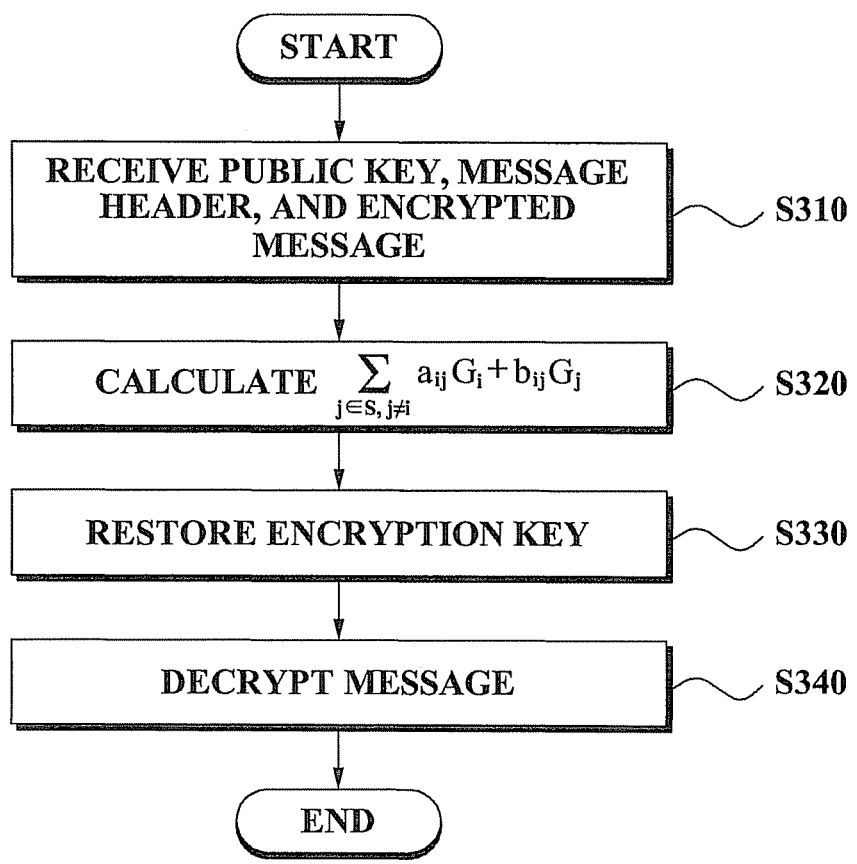
FIG. 3 is a flowchart illustrating a broadcast decryption method according to another example embodiment of the present invention.

FIG. 3 is a flowchart illustrating a broadcast decryption method according to another embodiment of the present invention. A user included in an authorized user group receives a public key, a message header, and an encrypted message in operation S310.

The user receives only a Strong Diffie-Hellman tuple corresponding to an authorized user group from within the public key, without needing to receive all public keys. The Strong Diffie-Hellman tuple corresponding to the authorized user group may be a set of Gi's related to the authorized user group. Since the transmitter 110 broadcasts the public key, the message header, and the encrypted message, all users can receive the public key, the message header, and the encrypted message. Only the user included in the authorized user group can restore an encryption key using the received information.

A value in accordance with Equation 6 is calculated using the Strong Diffie-Hellman tuple and the message header in operation S320:

$$\sum_{j \in S, j \neq i} a_{ij}G_i + b_{ij}G_j, \qquad \text{[Equation 6]}$$

where $a_{ij}$=1/(j−i), $b_{ij}$=−1(j−i), S denotes an authorized user group, Gi=(1/(x+i))G, Gj=(1/(x+j))G, i denotes an index corresponding to the user receiving the encrypted message, and j denotes an index of a member included in an authorized user group other than the user i.

Operation S320 may include calculating $a_{ij}$ and $b_{ij}$ using Equation 7 with respect to all users in the group except for the user i:

$$\frac{1}{(x+i)(x+j)} = \frac{a_{ij}}{x+i} + \frac{b_{ij}}{x+j} \rightarrow \quad \text{[Equation 7]}$$

$$aij = \frac{1}{(j-i)},$$

$$bij = \frac{-1}{(j-i)},$$

where x denotes an arbitrary element selected from the group Zp, i denotes an index corresponding to the user receiving an encrypted message, and j denotes an index of a member included in an authorized user group except for the user group containing the user i. A value in accordance with the above-described Equation 6 is calculated using $a_{ij}$ and $b_{ij}$.

In operation S330, a pairing operation is performed using the calculated value and the encryption key is restored. The pairing operation may use a pairing on an elliptic curve. The pairing operation is described in detail in "Collusion resistant broadcast encryption with short ciphertexts and private keys" in CRYPTO vol. 3621, pp. 258-275 in 2005, authored by D. Boneh, C. Gentry, and B. Waters.

Operation S330 may restore the encryption key using Equation 8:

$$K = \frac{e\left(D_i + \sum_{j \in S, j \neq i} a_{ij}G_i + b_{ij}G_j, B\right)}{e(A, G_i)} = e(W, G)^s \quad \text{[Equation 8]}$$

$$Hdr = \left(s\left(H + \sum_{j \in S, j \neq i} G_j\right), sG\right) = (A, B),$$

where K denotes an encryption key, e( ) denotes a pairing function defined on an elliptic curve, Hdr denotes the message header, H and W denote arbitrary elements in the group generated by G, s denotes an arbitrary element selected from the group Zp, G denotes a generator of a group having an order p on an elliptic curve, $a_{ij}=1/(j-i)$, $b_{ij}=-1(j-i)$, S denotes an authorized user group, Gi=(1/(x+i))G, Gj=(1/(x+j))G, i denotes an index corresponding to the user receiving the encrypted message, j denotes an index of a member included in an authorized user group except for the user group containing the user i, and Di denotes a secret key of the user i.

The encrypted message is decrypted using the restored encryption key in operation S340. Only the user corresponding to the authorized user group can efficiently decrypt the encrypted message without needing to receive all public keys.

The broadcast decryption process shown in FIG. 3 may be applied to each small group into which an entire user group is divided. The message header may be generated using a sum of the plurality of Strong Diffie-Hellman tuples corresponding to each small group.

Specifically, if a total number of users is 25, each of five small groups including five users for each small group can restore an encryption key and decrypt the encrypted message, similar to the broadcast decryption method of FIG. 3. Each operation shown in FIGS. 2 and 3 can be performed in sequence as illustrated, in reverse sequence, or simultaneously.

Figure 4:
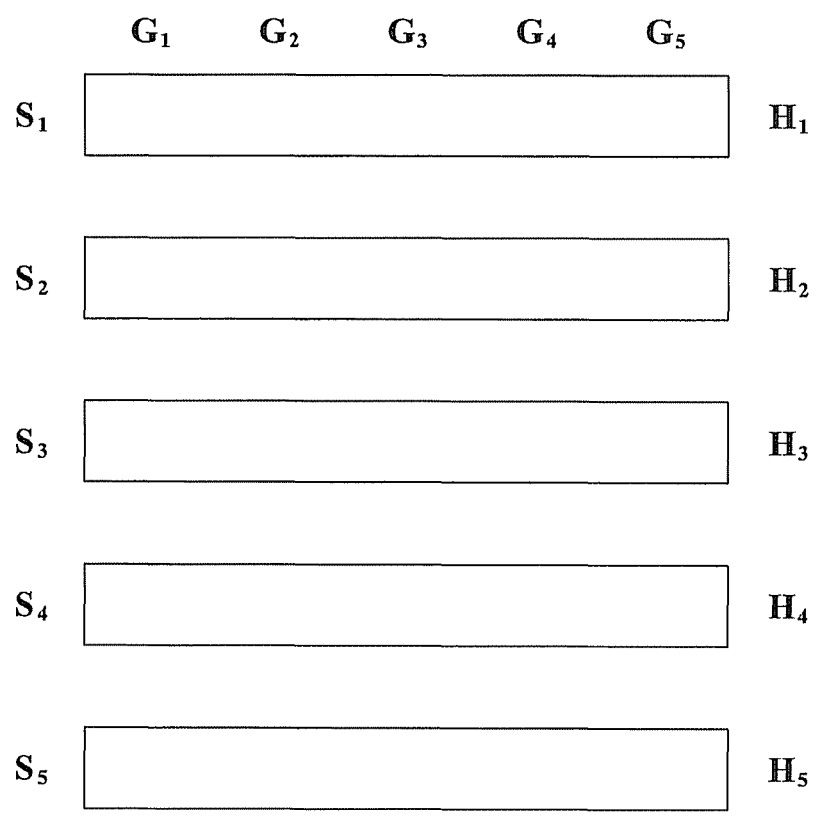
FIG. 4 is a diagram illustrating a case where a total number of users is divided into a plurality of small groups according to an example embodiment of the present invention.

FIG. 4 is a diagram illustrating a case where the users are divided into a plurality of small groups, according to an embodiment of the present invention. As shown in FIG. 4, 25 users are divided into five small groups with five users in each small group. $G_1$, $G_2$, $G_3$, $G_4$, and $G_5$ represent five users of a small group, in each small group. The five elements are used commonly in five small groups. $H_1$, $H_2$, $H_3$, $H_4$, and $H_5$ are selected as elements representing each small group.

The users are divided into the plurality of small groups. The broadcast decryption process and the broadcast encryption process applied to each small group is described in detail in "Collusion resistant broadcast encryption with short ciphertexts and private keys" in CRYPTO vol. 3621, pp. 258-275 in 2005 authored by D. Boneh, C. Gentry, and B. Waters.

In FIG. 4, $G_1$, $G_2$, $G_3$, $G_4$, and $G_5$ are equivalent to a description of G used above with reference to FIGS. 1 through 3. $S_1$, $S_2$, $S_3$, $S_4$, and $S_5$ denote each small group. $H_1$, $H_2$, $H_3$, $H_4$, and $H_5$ denote arbitrary elements selected in a group generated by G with respect to each small group. $G_1$, $G_2$, $G_3$, $G_4$, and $G_5$ can be commonly used, and sG can be commonly used from within the message header for efficiency during broadcast encryption/decryption.

Figure 5:
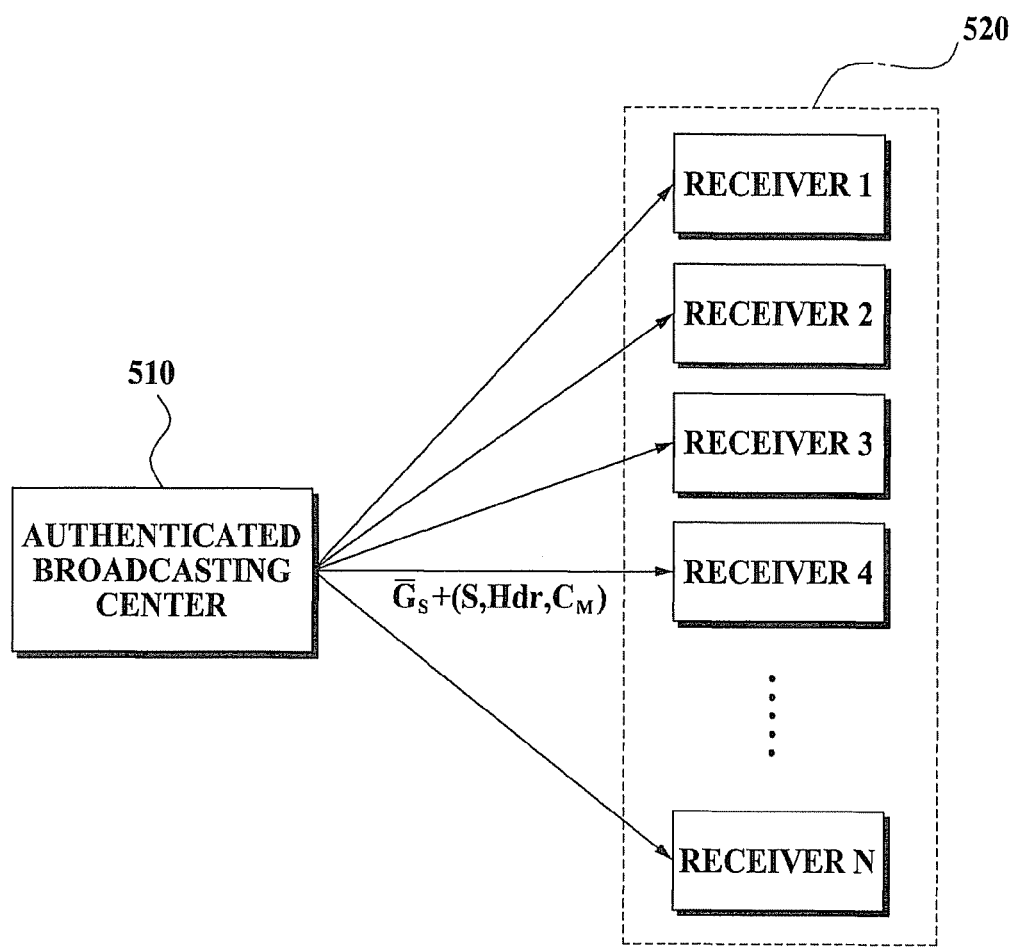
FIG. 5 is a diagram illustrating broadcast encryption message transmission according to another example embodiment of the present invention.

FIG. 5 is a diagram illustrating broadcast encryption message transmission according to another embodiment of the present invention. An authenticated broadcasting center 510 transmits a Strong Diffie-Hellman tuple $\hat{G}_S$ corresponding to an authorized user group S, information with respect to the authorized user group S, a message header Hdr, and an encrypted message $C_M$ to a plurality of receivers 520. The Strong Diffie-Hellman tuple $\hat{G}_S$ corresponding to the authorized user group S can be a set of Gi's related to the authorized user group S from among Gi's.

The encrypted message $C_M$ is encrypted using an encryption key K. The encryption key K is generated using a secret encryption key known to only the authenticated broadcasting center 510. The secret encryption key may be randomly selected from among arbitrary elements in a group generated by G. The header Hdr may be generated using the secret encryption key and the Strong Diffie-Hellman tuple corresponding to the authorized user. The header Hdr may be generated using a sum of a plurality of Strong Diffie-Hellman tuples corresponding to the authorized user. The authenticated broadcasting center 510 knowing the secret encryption key can generate the encryption key K and the header Hdr. Other users unaware of the secret encryption key cannot generate the encryption key K and the header Hdr.

Users included in the authorized user group S from among the receivers 520 can restore the encryption key K using a decryption key for each user that is previously known and a received plurality of information. Users who are unaware of the decryption key for each user, and are different from the authorized user group S, cannot restore the encryption key K from the transmitted information.

Figure 6:
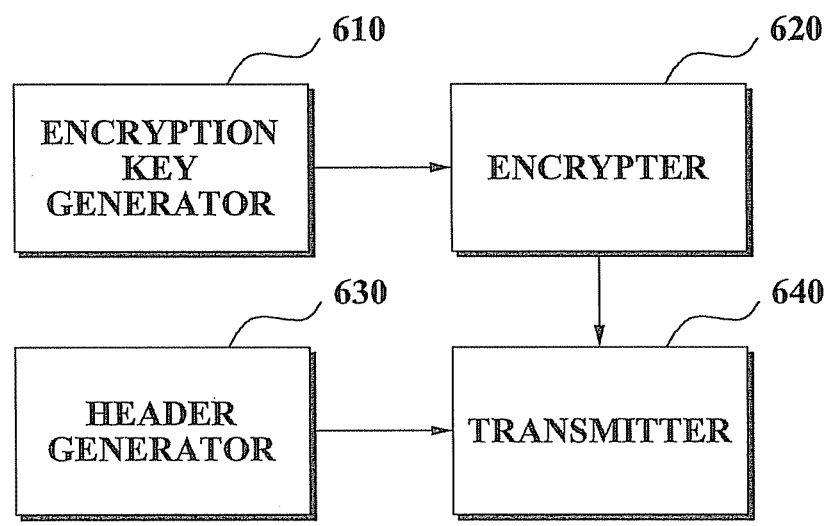
FIG. 6 is a block diagram illustrating a broadcast encryption apparatus according to an example embodiment of the present invention.

FIG. 6 is a block diagram illustrating a broadcast encryption apparatus 600 according to an embodiment of the present invention. The broadcast encryption apparatus 600 includes an encryption key generator 610, an encrypter 620, a header generator 630, and a transmitter 640. According to other aspects of the present invention, the broadcast encryption apparatus 600 may include additional or different units. Similarly, the functionality of one or more of the above units may be combined into a single component.

The encryption key generator 610 generates a message encryption key using a secret encryption key known to only an authenticated broadcasting center. The secret encryption key may be randomly selected from among arbitrary elements in a group generated by G.

The message encryption key may be generated using Equation 9:

$$K = e(W, G)^s, \quad \text{[Equation 9]}$$

where K denotes a message encryption key, W denotes an arbitrary element in a group generated by G and selected as a secret encryption key, and s denotes an arbitrary element selected from the group Zp having an order p, which is used to randomly generate the message encryption key K transmitted each time.

The authenticated broadcasting center knowing the secret encryption key can generate the encryption key. Other users unaware of the secret encryption key cannot generate the encryption key.

The encrypter 620 encrypts a message using the message encryption key. The header generator 630 generates a message header using the secret encryption key and a Strong Diffie-Hellman tuple corresponding to an authorized user. The message header may be generated using a sum of a plurality of Strong Diffie-Hellman tuples corresponding to the authorized user.

The message header may be generated using Equation 10:

$$Hdr = \left(s\left(H + \sum_{j \in S} G_j\right), sG\right),\quad \text{[Equation 10]}$$

where Hdr denotes a message header, G denotes a generator of a group having an order p on an elliptic curve, H denotes an arbitrary element in the group generated by G and selected as a secret encryption key, s denotes an arbitrary element selected from the group Zp, Gj=(1/(x+j))G, x denotes a predetermined element selected from the group Zp, S denotes an authorized user group, and j denotes an index corresponding to an authorized user. Gj is the Strong Diffie-Hellman tuple corresponding to the authorized user. The message header is generated using a sum of Gi's and the secret encryption key H.

The header generator 630 may divide the users into a predetermined number of small groups, and generate the message header using the secret encryption key and the Strong Diffie-Hellman tuple corresponding to the authorized user in each small group.

If a total number of users is 25, each of five small groups including five users for each small group may generate the message header using the secret encryption key and the Strong Diffie-Hellman tuple corresponding to the authorized user, and broadcast the message header. The message header may be generated using Equation 11:

$$Hdr = \left[s\left(H_1 + \sum_{j \in S_1} G_j\right), s\left(H_2 + \sum_{j \in S_2} G_j\right),\right.$$
$$\left. s\left(H_3 + \sum_{j \in S_3} G_j\right), s\left(H_4 + \sum_{j \in S_4} G_j\right), s\left(H_5 + \sum_{j \in S_5} G_j\right), sG\right],\quad \text{[Equation 11]}$$

where Hdr denotes a message header, G denotes a generator of a group having an order p on an elliptic curve, $S_1$ through $S_5$ denote small groups, $H_1$ through $H_5$ denote arbitrary elements in the group generated by G and selected as secret encryption keys corresponding to small groups $S_1$ through $S_5$, s denotes an arbitrary element selected from the group Zp, Gj=(1/(x+j))G, x denotes an arbitrary element selected from a group Zp, and j denotes an index corresponding to an authorized user in each small group.

The transmitter 640 transmits the encrypted message and the message header. The transmitter 640 may transmit the Strong Diffie-Hellman tuple corresponding to the authorized user group with the encrypted message and the message header. According to aspects of the present invention, the authenticated broadcasting center 510 does not transmit the Strong Diffie-Hellman tuple corresponding to the authorized user group along with a broadcast message. A receiver can receive and store the Strong Diffie-Hellman tuple corresponding to the authorized user group prior to receiving the broadcast message.

Figure 7:
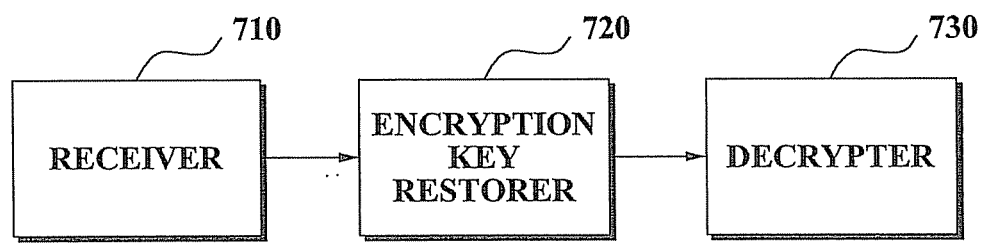
FIG. 7 is a block diagram illustrating a broadcast decryption apparatus according to an example embodiment of the present invention.

FIG. 7 is a block diagram illustrating a broadcast decryption apparatus 700 according to an embodiment of the present invention. The broadcast decryption apparatus 700 includes a receiver 710, an encryption key restorer 720, and a decrypter 730.

The receiver 710 receives a message header, an encrypted message, and a Strong Diffie-Hellman tuple corresponding to an authorized user. According to aspects of the present invention, the Strong Diffie-Hellman tuple corresponding to the authorized user group is not transmitted with a broadcast message. The receiver 710 may receive and store the Strong Diffie-Hellman tuple corresponding to the authorized user group prior to receiving the encrypted message. The group including all users can be divided into a predetermined number of small groups. The message header can be generated using the Strong Diffie-Hellman tuple corresponding to the authorized user in each small group.

The encryption key restorer 720 performs a pairing operation using a decryption key for each user, the message header, and the Strong Diffie-Hellman tuple, and restores an encryption key. The decryption key is known only to the authorized user. The encryption key restorer 720 may perform a pairing operation using Equation 12 and Equation 13:

$$K = \frac{e\left(D_i + \sum_{j \in S, j \neq i} a_{ij}G_i + b_{ij}G_j, B\right)}{e(A, G_i)} = e(W, G)^s \quad \text{[Equation 12]}$$

$$Hdr = \left(s\left(H + \sum_{j \in S, j \neq i} G_j\right), sG\right) = (A, B),$$

where K denotes an encryption key, e( ) denotes a pairing function defined on an elliptic curve, Hdr denotes a message header, G denotes a generator of a group having an order p on an elliptic curve, H and W denote arbitrary elements of the group generated by G, s denotes an arbitrary element selected from the group Zp, $a_{ij}$=1/(j−i), $b_{ij}$=−1/(j−i), S denotes an authorized user group, Gi=(1/(x+i))G, Gj=(1/(x+j))G, i denotes an index corresponding to the authorized user receiving the encrypted message, Di denotes a decryption key for the authorized user i, and j denotes an index corresponding to an authorized user other than the authorized user i, and $$\frac{1}{(x+i)(x+j)} = \frac{a_{ij}}{x+i} + \frac{b_{ij}}{x+j} \rightarrow \quad \text{[Equation 13]}$$

$$aij = \frac{1}{(j-i)},$$

$$bij = \frac{-1}{(j-i)},$$

where x denotes an arbitrary element selected from the group Zp, i denotes an index corresponding to the user receiving the encrypted message, and j denotes an index of a member included in an authorized user group other than the authorized user i.

The message header Hdr is generated in accordance with the above-described Equation 12. However, only A and B being a result of above-described Equation 12 are transmitted and received. An arbitrary element H in a group generated by G used for a generation process is treated as a secret for the receiver. Similarly, the encryption key K and an arbitrary element W in the group generated by G used for the generation process are treated as the secret for the receiver.

The encryption key restorer 720 restores the encryption key K by using a decryption key Di for each user, the message header Hdr=(A, B), and the Strong Diffie-Hellman tuple Gi corresponding to the authorized user. The decryption key is known only to the authorized user. It can be proved that an operation result of the above-described Equation 12 is equivalent to an initial encryption key.

The decryption key for each user may be generated using Equation 14:

$$D_i = W + \frac{1}{x+i}H + \frac{1}{(x+i)^2}G,$$  [Equation 14]

where Di denotes a secret key of a user corresponding to i from among a number of users, G denotes a generator of a group having an order p on an elliptic curve, W and H denote arbitrary elements of the group generated by G, x denotes an arbitrary element selected from the group Zp, i denotes a natural number in a range of $1 \leq i \leq n$, and n denotes a total number of users. Di is the only value known to the authorized user. Arbitrary elements W and H in the group generated by G used for the generation process are treated as the secret for the receiver. The decrypter 730 decrypts the encrypted message using the encryption key.

Figure 8:
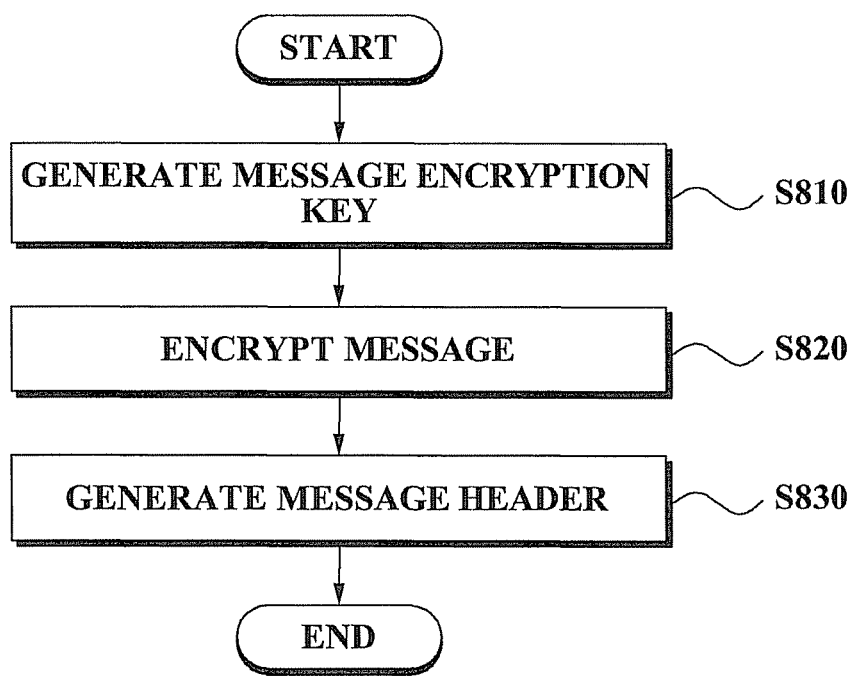
FIG. 8 is a flowchart illustrating a broadcast encryption method according to another example embodiment of the present invention.

FIG. 8 is a flowchart illustrating a broadcast encryption process according to another embodiment of the present invention. In operation S810, a message encryption key is generated using a secret encryption key known to only an authenticated broadcasting center. The secret encryption key may be randomly selected from among arbitrary elements in a group generated by G. The message encryption key may be generated using Equation 15:

$$K = e(W,G)^s$$  [Equation 15]

where K denotes a message encryption key, W denotes an arbitrary element of a group generated by G and selected as a secret encryption key, and s denotes an arbitrary element selected from the group Zp having an order p, which is used to randomly generate the message encryption key K transmitted each time. The authenticated broadcasting center 510, knowing the secret encryption key, can generate the encryption key. Other users unaware of the secret encryption key cannot generate the encryption key.

In operation S820, a message is encrypted using the message encryption key. In operation S830, a message header is generated using the secret encryption key and a Strong Diffie-Hellman tuple corresponding to an authorized user. The message header may be generated using a sum of a plurality of Strong Diffie-Hellman tuples corresponding to the authorized user. The message header may be generated using Equation 16:

$$Hdr = \left(s\left(H + \sum_{j \in S} G_j\right), sG\right),$$  [Equation 16]

where Hdr denotes a message header, G denotes a generator of a group having an order p on an elliptic curve, H denotes an arbitrary element in the group generated by G and selected as the secret encryption key, s denotes an arbitrary element selected from the group Zp, Gj=(1/(x+j))G, x denotes a predetermined element selected from the group Zp, S denotes an authorized user group, and j denotes an index corresponding to an authorized user. Gj is the Strong Diffie-Hellman tuple corresponding to the authorized user. The message header is generated using a sum of Gi's and the secret encryption key H.

The group of all users may be divided into a predetermined number of small groups, and the message header can be generated using the secret encryption key and the Strong Diffie-Hellman tuple corresponding to the authorized user in each small group. If the total number of users is 25, each of five small groups including five users for each small group may generate the message header using the secret encryption key and the Strong Diffie-Hellman tuple corresponding to the authorized user, and broadcast the message header. The message header may be generated using Equation 17:

$$Hdr = \left[s\left(H_1 + \sum_{j \in S_1} G_j\right), s\left(H_2 + \sum_{j \in S_2} G_j\right),\right.$$
$$\left.s\left(H_3 + \sum_{j \in S_3} G_j\right), s\left(H_4 + \sum_{j \in S_4} G_j\right), s\left(H_5 + \sum_{j \in S_5} G_j\right), sG\right],$$  [Equation 17]

where Hdr denotes a message header, G denotes a generator of a group having an order p on an elliptic curve, $S_1$ through $S_5$ denote small groups, $H_1$ through $H_5$ denote arbitrary elements in a group generated by G and selected as secret encryption keys corresponding to small groups $S_1$ through $S_5$, s denotes an arbitrary element selected from the group Zp, Gj=(1/(x+j))G, x denotes an arbitrary element selected from the group Zp, and j denotes an index corresponding to an authorized user in each small group.

Figure 9:
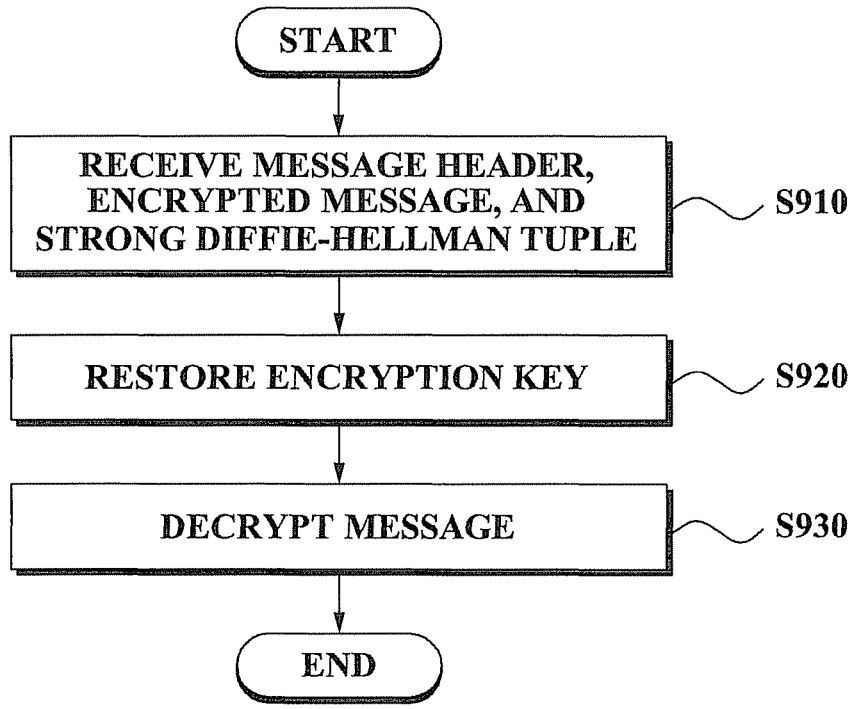
FIG. 9 is a flowchart illustrating a broadcast decryption method according to another example embodiment of the present invention.

FIG. 9 is a flowchart illustrating a broadcast decryption process according to another embodiment of the present invention. In operation S910, an encrypted message and a Strong Diffie-Hellman tuple corresponding to an authorized user is received. According to aspects of the present invention, the Strong Diffie-Hellman tuple corresponding to the authorized user group is not transmitted with a broadcast message. The receiver 710 may receive and store the Strong Diffie-Hellman tuple corresponding to the authorized user group prior to receiving the broadcast message. The group of all users may be divided into a predetermined number of small groups, and the message header can be generated using the Strong Diffie-Hellman tuple corresponding to the authorized user in each small group.

In operation S920, a pairing operation is performed using a decryption key for each user, the message header, and the Strong Diffie-Hellman tuple, and an encryption key is restored. The decryption key is known only to the authorized user. The pairing operation may be performed using Equation 18 and Equation 19:

$$K = \frac{e\left(D_i + \sum_{j \in S, j \neq i} a_{ij}G_i + b_{ij}G_j, B\right)}{e(A, G_i)} = e(W, G)^s$$  [Equation 18]

$$Hdr = \left(s\left(H + \sum_{j \in S, j \neq i} G_j\right), sG\right) = (A, B),$$

where K denotes the encryption key, e( ) denotes a pairing function defined on an elliptic curve, Hdr denotes the message header, G denotes a generator of a group having an order p on an elliptic curve, H and W denote arbitrary elements in the group generated by G, s denotes an arbitrary element selected from the group Zp, $a_{ij}=1/(j-i)$, $b_{ij}=-1/(j-i)$, S denotes an authorized user group, $Gi=(1/(x+i))G$, $Gj=(1/(x+j))G$, i denotes an index corresponding to an authorized user receiving the encrypted message, Di denotes a decryption key for corresponding to the authorized user i, and j denotes an index corresponding to an authorized user other than the authorized user i.

$$\frac{1}{(x+i)(x+j)} = \frac{a_{ij}}{x+i} + \frac{b_{ij}}{x+j} \rightarrow$$

$$aij = \frac{1}{(j-i)},$$

$$bij = \frac{-1}{(j-i)},$$

[Equation 19]

where x denotes an arbitrary element selected from the group Zp, i denotes an index of the user receiving the encrypted message, and j denotes an index of a member included in an authorized user group other than the authorized user i.

The message header Hdr is generated in accordance with the above-described Equation 18. However, only A and B being a result of the above-described Equation 18 are transmitted and received. An arbitrary element H in a group generated by G used for a generation process is treated as a secret for a receiver. Similarly, the encryption key K and an arbitrary element W in the group generated by G used for the generation process are treated as the secret for the receiver.

The encryption key K is restored using a decryption key Di for each user, the message header Hdr=(A, B), and the Strong Diffie-Hellman tuple Gi corresponding to the authorized user. The decryption key is known only to the authorized user. It can be proved that an operation result of Equation 18 is equivalent to the initial encryption key.

The decryption key for each user may be generated using Equation 20:

$$D_i = W + \frac{1}{x+i}H + \frac{1}{(x+i)^2}G,$$

[Equation 20]

where Di denotes a secret key of a user i from among a number of users, G denotes a generator of a group having an order p on an elliptic curve, W and H denote arbitrary elements in the group generated by G, x denotes an arbitrary element selected from the group Zp, i denotes a natural number in a range of 1≤i≤n, and n denotes a total number of users. Di is the only value known to the authorized user. Arbitrary elements W and H in the group generated by G used for the generation process are treated as the secret for the receiver.

In operation S930, the encrypted message is decrypted using the encryption key.

A broadcast encryption method and a broadcast decryption method according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, a broadcast encryption method and a broadcast decryption method is provided that can reduce a transmission amount and a storage amount by using a Strong Diffie-Hellman tuple, thereby performing broadcast encryption/decryption.

According to aspects of the present invention, a broadcast encryption method and a broadcast decryption method that can generate a message header using only a Strong Diffie-Hellman tuple corresponding to either an authorized user group or a leaver group, or can transmit the Strong Diffie-Hellman tuple included in a public key, thereby efficiently performing broadcast encryption/decryption.

According to aspects of the present invention, a broadcast encryption method and a broadcast decryption method are provided that can divide all users into a plurality of small groups, and enable each small group to share a Strong Diffie-Hellman tuple, thereby efficiently reducing a transmission amount of broadcast encryption.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A broadcast encryption method comprising:
    generating at least one Strong Diffie-Hellman tuple in accordance with the equation $(1/(x+1))G$, $(1/(x+2))G, \ldots$, and $(1/(x+n))G$, where G denotes a generator of a group having an order p on an elliptic curve, x denotes an arbitrary element selected from a group Zp of order p, and n denotes a total number of users;
    generating a message encryption key using a public key and a secret key generated using the Strong Diffie-Hellman tuple;
    encrypting a message using the message encryption key;
    generating a message header using a sum of a plurality of Strong Diffie-Hellman tuples corresponding to an authorized user group; and
    transmitting the message header, the encrypted message, and the Strong Diffie-Hellman tuple to at least one receiver.

2. The broadcast encryption method of claim 1, further comprising generating no more than n+2 public keys and n secret keys using the Strong Diffie-Hellman tuple,
    wherein the message encryption key is generated using at least one public key from the no more than n+2 public keys and at least one secret key from the n secret keys; and
    wherein n denotes a total number of users.

3. The method of claim 2, wherein the n+2 public keys are in accordance with Equation 1 and the n secret keys are in accordance with Equation 2:

$$PK = \left(G, H, \frac{1}{x+1}G, \frac{1}{x+2}G, \ldots, \frac{1}{x+n}G\right) x \in Z_p, \quad \text{[Equation 1]}$$

and $$D_i = W + \frac{1}{x+i}H + \frac{1}{(x+i)^2}G, \quad \text{[Equation 2]}$$

where PK denotes the public key, Di denotes a secret key of a user i, G denotes a generator of a group having an order p on an elliptic curve, W and H denote arbitrary elements in the group generated by G, x denotes an arbitrary element selected from a group Zp, i denotes a natural number in a range of 1≤i≤n, and n denotes a total number of users.

4. The method of claim 3, wherein the generating of the message encryption key comprises generating the message encryption key using Equation 3:

$$K = e(W, G)^s, s \in Zp \quad \text{[Equation 3]}$$

$$e(W, G) = \frac{e(D_i, G)}{e(H, G_i)e(G_i, G_i)},$$

where K denotes the message encryption key, e( ) denotes a pairing function defined on an elliptic curve, s denotes an arbitrary element selected from the group Zp, and Gi=(1/(x+i))G.

5. The method of claim 4, wherein the generating of the message header comprises generating the message header using Equation 4:

$$Hdr = \left(s\left(H + \sum_{j \in S} G_j\right), sG\right), \quad \text{[Equation 4]}$$

where Hdr denotes the message header, Gj=(1/(x+j))G, and S denotes the authorized user group.

6. The method of claim 2, wherein the message header, the encrypted message, and the Strong Diffie-Hellman tuple are transmitted to each small group into which an entire user group is divided.

7. The method of claim 1, wherein the message header, the encrypted message, and the Strong Diffie-Hellman tuple are transmitted to each small group into which an entire user group is divided;
each small group comprises five users; and
the generating of the message header comprises generating the message header using Equation 5:

$$Hdr = \left[s\left(H_1 + \sum_{j \in S_1} G_j\right), s\left(H_2 + \sum_{j \in S_2} G_j\right),\right.$$
$$\left. s\left(H_3 + \sum_{j \in S_3} G_j\right), s\left(H_4 + \sum_{j \in S_4} G_j\right), s\left(H_5 + \sum_{j \in S_5} G_j\right), sG\right], \quad \text{[Equation 5]}$$

where Hdr denotes a message header, G denotes a generator of a group having an order p on an elliptic curve, H1 through H5 denote arbitrary elements of the group generated by G, s denotes an arbitrary element selected from a group Zp, Gj=(1/(x+j))G, and S1 through S5 denote small groups.

8. A broadcast decryption method comprising:
receiving, by a user included in an authorized user group, a Strong Diffie-Hellman tuple corresponding to the group from within a public key, a message header, and an encrypted message;
calculating a value using the Strong Diffie-Hellman tuple and the message header in accordance with Equation 6:

$$\sum_{j \in S, j \neq i} a_{ij} G_i + b_{ij} G_j, \quad \text{[Equation 6]}$$

where $a_{ij}=1/(j-i)$, $b_{ij}=-1(j-i)$, S denotes the authorized user group, Gi=(1/(x+i))G, Gj=(1/(x+j))G, G denotes a generator of a group having an order p on an elliptic curve, i denotes an index corresponding to the user receiving the encrypted message, and j denotes an index of a member included in the authorized user group other than the user i;
performing a pairing operation using the calculated value and restoring an encryption key; and
decrypting the encrypted message using the encryption key.

9. The method of claim 8, wherein the calculating of the value comprises:
calculating $a_{ij}$ and $b_{ij}$ using Equation 7 with respect to all users in the group except for the user i:

$$\frac{1}{(x+i)(x+j)} = \frac{a_{ij}}{x+i} + \frac{b_{ij}}{x+j} \rightarrow aij = \frac{1}{(j-i)}, \quad \text{[Equation 7]}$$

$$bij = \frac{-1}{(j-i)},$$

where x denotes an arbitrary element selected from a group Zp; and
calculating a value in accordance with Equation 6 using $a_{ij}$ and $b_{ij}$.

10. The method of claim 9, wherein the restoring of the encryption key comprises restoring the encryption key using Equation 8:

$$K = \frac{e\left(D_i + \sum_{j \in S, j \neq i} a_{ij}G_i + b_{ij}G_j, B\right)}{e(A, G_i)} \quad \text{[Equation 8]}$$

$$= e(W, G)^s$$

$$Hdr = \left(s\left(H + \sum_{j \in S, j \neq i} G_j\right), sG\right)$$

$$= (A, B),$$

where K denotes an encryption key, e( ) denotes a pairing function defined on an elliptic curve, Hdr denotes the message header, H and W denote arbitrary elements in a group generated by G, s denotes an arbitrary element selected from the group Zp, and Di denotes a secret key of the user i.

11. The method of claim 8, wherein the Strong Diffie-Hellman tuple corresponding to the group is a set of Gi's related to the group.

12. The method of claim 8, wherein the message header, the encrypted message, and the Strong Diffie-Hellman tuple are transmitted to each small group into which an entire user group is divided.

13. A non-transitory computer-readable recording medium storing a program to implement a broadcast encryption method, the method comprising:

generating at least one Strong Diffie-Hellman tuple in accordance with the equation $(1/(x+1))G$, $(1/(x+2))G, \ldots$, and $(1/(x+n))G$, where G denotes a generator of a group having an order p on an elliptic curve, x denotes an arbitrary element selected from a group Zp of order p, and n denotes a total number of users;

generating a message encryption key using a public key and a secret key generated using the Strong Diffie-Hellman tuple;

encrypting a message using the message encryption key; and generating a message header using a sum of a plurality of Strong Diffie-Hellman tuples corresponding to an authorized user group.

* * * * *